US 11,466,588 B2

(12) United States Patent
Kiely et al.

(10) Patent No.: US 11,466,588 B2
(45) Date of Patent: Oct. 11, 2022

(54) AXIALLY RIGID CURVED BEAM WITH SQUEEZE DAMPER

(71) Applicant: United Technologies Corporation, Farmington, CT (US)

(72) Inventors: David C. Kiely, Manchester, CT (US); Todd A. Davis, Tolland, CT (US); Russell B. Witlicki, Wethersfield, CT (US); Christopher M. Valva, Manchester, CT (US); Andrew Newton, Ellington, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 317 days.

(21) Appl. No.: 16/668,786

(22) Filed: Oct. 30, 2019

(65) Prior Publication Data
US 2021/0131304 A1    May 6, 2021

(51) Int. Cl.
*F01D 25/04*    (2006.01)
*F01D 25/16*    (2006.01)

(52) U.S. Cl.
CPC ........... *F01D 25/04* (2013.01); *F01D 25/164* (2013.01); *F05D 2220/323* (2013.01); *F05D 2240/50* (2013.01); *F05D 2260/96* (2013.01)

(58) Field of Classification Search
CPC ........ F01D 25/04; F01D 25/16; F01D 25/162; F01D 25/164; F05D 2260/97; F05D 2240/50; F05D 2220/323
See application file for complete search history.

(56) References Cited

U.S. PATENT DOCUMENTS

| 4,213,661 | A | | 7/1980 | Marmol | |
|---|---|---|---|---|---|
| 4,952,076 | A | * | 8/1990 | Wiley, III | F01D 25/164 384/535 |
| 4,981,415 | A | * | 1/1991 | Marmol | F16C 27/045 416/174 |
| 4,992,024 | A | | 2/1991 | Heydrich | |
| 7,419,304 | B2 | | 9/2008 | Mavrosakis | |
| 7,648,278 | B2 | * | 1/2010 | Stout | F16F 15/0237 384/99 |
| 8,202,003 | B2 | | 6/2012 | Klusman et al. | |
| 8,353,633 | B2 | | 1/2013 | Griffin | |
| 9,745,992 | B2 | | 8/2017 | Barber et al. | |
| 10,316,691 | B2 | | 6/2019 | Murayama | |

(Continued)

OTHER PUBLICATIONS

European Search Report for EP Patent Application No. 20204670 dated Mar. 23, 2021.

*Primary Examiner* — Eldon T Brockman
*Assistant Examiner* — Elton K Wong
(74) *Attorney, Agent, or Firm* — Carlson, Gaskey & Olds, P.C.

(57) ABSTRACT

A gas turbine engine component includes an inner support structure surrounding an engine center axis and fixed to an engine static structure, an outer support structure spaced radially outward of the inner support structure, and a curved beam comprised of a plurality of curved beam spring segments that are positioned adjacent to each other to form a ring. The inner and outer support structures are coupled together around the curved beam to enclose the curved beam therebetween and form an assembly. A bearing is spaced radially inward of the assembly.

18 Claims, 5 Drawing Sheets

(56) References Cited

U.S. PATENT DOCUMENTS

| | | | |
|---|---|---|---|
| 2006/0204153 A1 | 9/2006 | Alam et al. | |
| 2010/0278465 A1* | 11/2010 | Klusman | F01D 25/28 384/114 |
| 2011/0171012 A1* | 7/2011 | Vetters | F01D 25/164 415/174.2 |
| 2012/0189429 A1* | 7/2012 | Witlicki | F01D 25/164 415/119 |
| 2015/0233382 A1 | 8/2015 | Nguyen-Schaefer | |
| 2016/0024926 A1* | 1/2016 | Jaureguiberry | F01D 11/005 416/182 |
| 2016/0138421 A1* | 5/2016 | Duong | F01D 25/162 384/581 |
| 2016/0327098 A1* | 11/2016 | Long, Jr. | F01D 25/164 |
| 2019/0360524 A1* | 11/2019 | Ellwood, III | F16C 33/583 |

* cited by examiner

AXIALLY RIGID CURVED BEAM WITH SQUEEZE DAMPER

STATEMENT REGARDING FEDERALLY SPONSORED RESEARCH OR DEVELOPMENT

This invention was made with Government support awarded by the United States. The Government has certain rights in this invention.

BACKGROUND

This application relates to a gas turbine engine that includes an axially rigid curved beam and a squeeze damper.

Gas turbine engines are known and typically include a fan delivering air into a bypass duct as bypass air and into a compressor as core air. The air is compressed and delivered into a combustor section where the air is mixed with fuel and ignited. Products of the combustion pass downstream over turbine rotors, which causes the turbine rotors to rotate.

Gas turbine engines require specific support stiffnesses and/or oil feed dampers to manage vibrations of rotating and static structures at specific operating speeds. In one configuration, a centering spring is used in combination with an oil damper that is positioned between a bearing outer race and a static engine structure. The oil damper comprises an oil squeeze film damper made from a plurality of segments that are mounted directly between the outer race and the engine static structure. The centering spring extends axially away from one end of the film damper to a distal end that is fixed to the static engine structure. While this configuration is effective at managing vibrations, a significant amount of axial space is consumed by the centering spring and damper. Additionally, the centering spring and damper are expensive and complicated to machine due to the large number of tightly controlled surfaces to manage stress and stiffness for a given amount of deflection. Curved beam dampers can also be used to dampen vibrations; however, this configuration is not conducive for providing an effective and reliable oil film damper.

SUMMARY

In a featured embodiment, a gas turbine engine component includes an inner support structure surrounding an engine center axis and fixed to an engine static structure, an outer support structure spaced radially outward of the inner support structure, and a curved beam comprised of a plurality of curved beam spring segments that are positioned adjacent to each other to form a ring. The inner and outer support structures are coupled together around the curved beam to enclose the curved beam therebetween and form an assembly. A bearing is spaced radially inward of the assembly.

In another embodiment according to the previous embodiment, a fluid damper is spaced radially inward of the inner support structure.

In another embodiment according to any of the previous embodiments, the outer support structure is fixed to an outer race of the bearing and the inner support structure is fixed to a flange of the engine static structure.

In another embodiment according to any of the previous embodiments, the bearing includes an inner race fixed for rotation with a shaft about the engine center axis, the outer race is fixed to the outer support structure, rolling elements are received between the inner and outer races, and a bearing housing surrounds the outer race to form a plurality of fluid damping chambers between the bearing housing and the outer race that are sealed by one or more piston rings or o-rings to provide the fluid damper.

In another embodiment according to any of the previous embodiments, the outer race is mounted to the outer support structure and the bearing housing is supported by the flange of the engine static structure.

In another embodiment according to any of the previous embodiments, the curved beam has an outer peripheral surface and an inner peripheral surface surrounding the engine center axis, and wherein the plurality of curved beam spring segments are circumferentially positioned adjacent to each other to form the ring, and wherein the inner and outer support structures surround the curved beam such that the outer peripheral surface of the curved beam faces an inner surface of the outer support structure and the inner peripheral surface of the curved beam faces an outer surface of the inner support structure.

In another embodiment according to any of the previous embodiments, each curved beam spring segment includes an arcuate body having at least one outer damper pedestal extending radially outward of an outer peripheral surface of the arcuate body and at least one inner damper pedestal extending radially inward of an inner peripheral surface of the arcuate body, and wherein the outer damper pedestal is engageable with the outer support structure and the inner damper pedestal is engageable with the inner support structure.

In another embodiment according to any of the previous embodiments, each arcuate body extends circumferentially from a first end to a second end that is opposite the first end, and wherein the at least one outer damper pedestal is positioned centrally between the first and second ends, and wherein the at least one inner damper pedestal comprises at least a first inner damper pedestal adjacent the first end and a second inner damper pedestal adjacent to the second end.

In another embodiment according to any of the previous embodiments, the outer support structure comprises a first ring-shaped structure with a first set of tabs and a first set of slots, and wherein the inner support structure comprises a second ring-shaped structure with a second set of tabs and a second set of slots, and wherein the inner and outer structures are coupled together by inserting the second set of tabs through the first set of slots and by inserting the first set of tabs through the second set of slots.

In another embodiment according to any of the previous embodiments, the plurality of curved beam spring segments comprises at least 10 segments.

In another featured embodiment, a gas turbine engine component includes an inner support structure surrounding an engine center axis and fixed to an engine static structure, an outer support structure spaced radially outward of the inner support structure, and a curved beam comprised of a plurality of curved beam spring segments that are positioned adjacent to each other to form a ring. The inner and outer support structures are coupled together around the curved beam to enclose the curved beam therebetween and form an assembly. A bearing is spaced radially inward of the assembly and a squeeze film damper is associated with the bearing.

In another embodiment according to any of the previous embodiments, the bearing includes an inner race fixed for rotation with a shaft about the engine center axis, an outer race fixed to the outer support structure, rolling elements received between the inner and outer races, and a bearing housing surrounding the outer race to form a plurality of fluid damping chambers between the bearing housing and the outer race that are sealed by one or more piston rings or o-rings to provide the squeeze film damper.

In another embodiment according to any of the previous embodiments, each curved beam spring segment includes an arcuate body having at least one outer damper pedestal extending radially outward of an outer peripheral surface of the arcuate body and at least one inner damper pedestal extending radially inward of an inner peripheral surface of the arcuate body, and wherein the outer damper pedestal is engageable with the outer support structure and the inner damper pedestal is engageable with the inner support structure.

In another embodiment according to any of the previous embodiments, each arcuate body extends circumferentially from a first end to a second end that is opposite the first end, and wherein the at least one outer damper pedestal is positioned centrally between the first and second ends, and wherein the at least one inner damper pedestal comprises at least a first inner damper pedestal adjacent the first end and a second inner damper pedestal adjacent to the second end.

In another embodiment according to any of the previous embodiments, the outer support structure comprises a first ring-shaped structure with a first set of tabs and a first set of slots, and wherein the inner support structure comprises a second ring-shaped structure with a second set of tabs and a second set of slots, and wherein the inner and outer structures are coupled together by inserting the second set of tabs through the first set of slots and by inserting the first set of tabs through the second set of slots.

In another embodiment according to any of the previous embodiments, the curved beam has an outer peripheral surface and an inner peripheral surface surrounding the engine center axis, and wherein the plurality of curved beam spring segments are circumferentially positioned adjacent to each other to form the ring, and wherein the inner and outer support structures surround the curved beam such that the outer peripheral surface of the curved beam faces the first ring-shaped structure and the inner peripheral surface of the curved beam faces the second ring-shaped structure.

In another embodiment according to any of the previous embodiments, the outer support structure is fixed to the outer race and the inner support structure is fixed to a flange of the engine static structure.

In another embodiment according to any of the previous embodiments, the bearing housing is supported by the engine static structure.

In another embodiment according to any of the previous embodiments, the outer support structure includes a first mount interface that is attached to the outer race and the inner support structure includes a second mount interface that is attached to the flange.

In another embodiment according to any of the previous embodiments, wherein an outer surface of the bearing housing is radially aligned with and spaced apart from the assembly by a gap.

These and other features may be best understood from the following drawings and specification.

DETAILED DESCRIPTION

Figure 1:
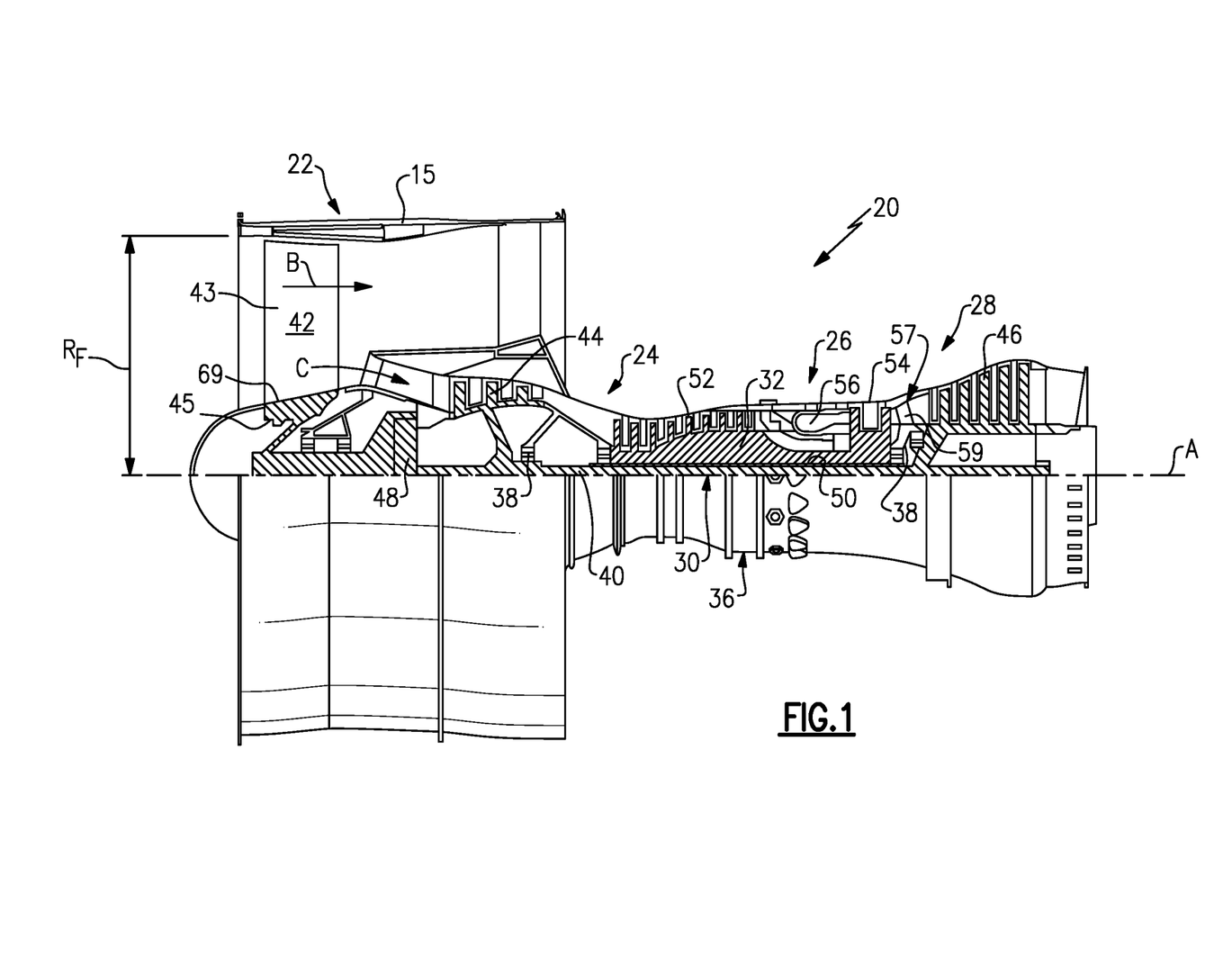
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a first (or low) pressure compressor 44 and a first (or low) pressure turbine 46. The inner shaft 40 is connected to a fan 42 through a speed change mechanism, which in exemplary gas turbine engine 20 is Illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }°R)/(518.7°R)]^{0.5}$. The "Low corrected fan tip speed" as disclosed herein according to one non-limiting embodiment is less than about 1150 ft/second (350.5 meters/second).

Figure 2:
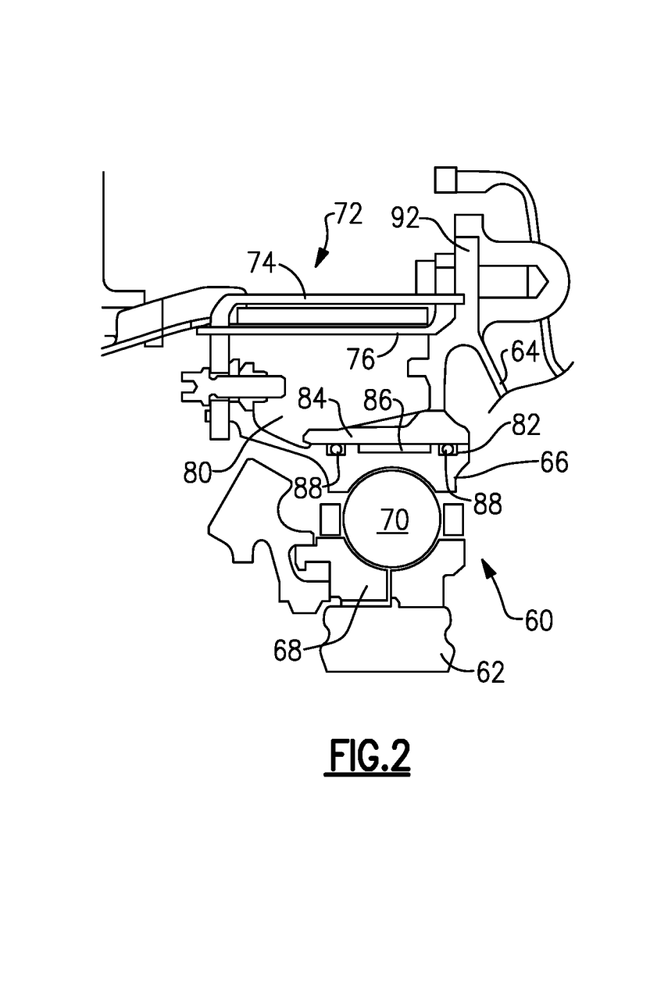
FIG. 2 is a section view of an axially rigid curved beam and a squeeze damper mounted to an engine static structure.

FIG. 2 shows an example of an axially rigid curved beam and a fluid damper that cooperate to provide support stiffness and damping to manage vibrations of associated rotating and static structures at specific engine operating speeds. At least one bearing 60 supports a rotating structure 62, such as a shaft for example, for rotation relative to an engine static structure 64, such as a case structure, for example. The bearing 60 includes an outer race 66, an inner race 68, and one or more rolling elements 70 between the inner 68 and outer 66 races. The inner race 68 is fixed for rotation with the shaft 62 and the outer race is fixed to the engine static structure 64.

Figure 3:
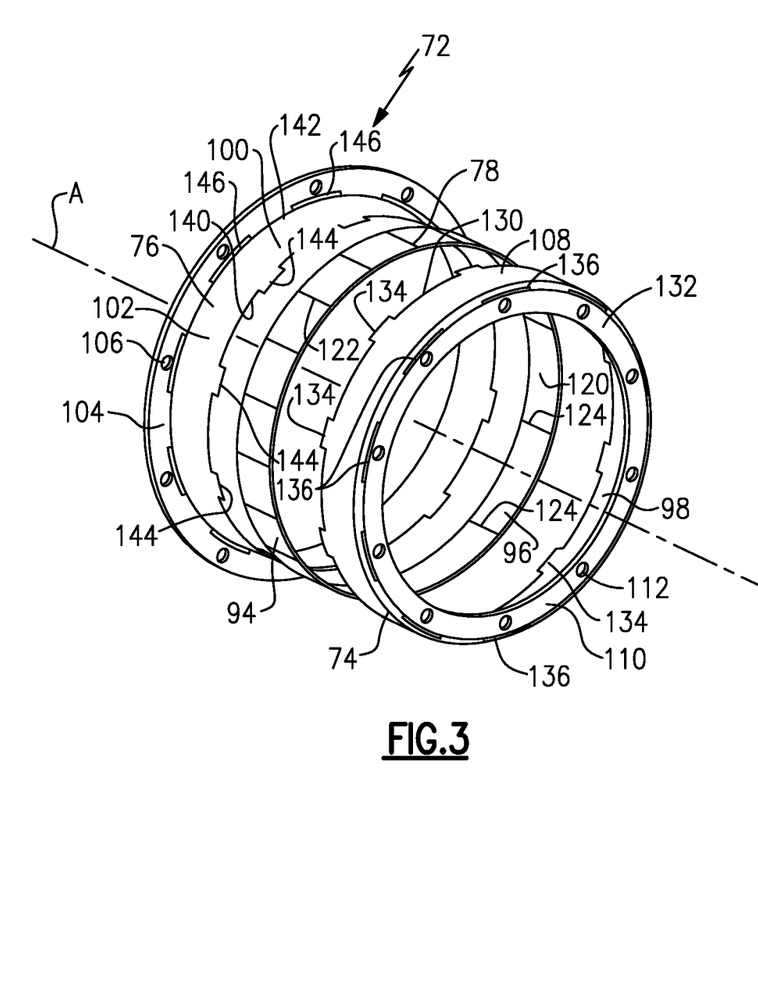
FIG. 3 is an exploded view of an assembly of the axially rigid curved beam of FIG. 2, and which shows an outer support, a plurality of curved beam spring segments, and an inner support.

An assembly 72 that comprises an axially rigid curved beam is installed radially outward of the bearing 60. The assembly 72 includes an outer support structure 74 fixed to the engine static structure 64, an inner support structure 76 surrounding the engine center axis A and fixed to the engine static structure 64, and a curved beam comprised of a plurality of curved beam spring segments 78 that are positioned adjacent to each other to form a ring as shown in FIG. 3. The inner 76 and outer 74 support structures are coupled together around the curved beam spring segments 78 of the curved beam to enclose the curved beam therebetween and form the assembly 72. The bearing 60 is spaced radially inward of the assembly such that there is a compartment 80 between the assembly 72 and the bearing 60.

As shown in FIG. 2, a fluid damper 82 is spaced radially inward of the inner support structure 76 of the assembly 72. In one example, the fluid damper 82 comprises an oil squeeze film damper. The bearing 60 includes a bearing housing 84 surrounding the outer race 66 to form a plurality of fluid damping chambers 86 between the bearing housing 84 and the outer race 66 that are sealed by one or more piston rings or o-rings 88 to provide the fluid damper 82. Fluid flows through the chambers 86 via a fluid inlet and outlet (not shown) to provide damping as known. An outer surface of the bearing housing 84 is radially aligned with and spaced apart from the assembly 72 by the compartment 80.

The outer support structure 74 is fixed to the outer race 66 and the inner support structure 76 is fixed to a flange 92 of the engine static structure 64. The bearing housing 84 is supported by the engine static structure 64.

As shown in FIG. 3, the plurality of curved beam spring segments 78 that form a ring have an outer peripheral surface 94 and an inner peripheral surface 96 surrounding the engine center axis A. The plurality of curved beam spring segments 78 are circumferentially positioned adjacent to each other end-to-end to form the ring. The inner 76 and outer 74 support structures surround the curved beam spring segments 78 such that the outer peripheral surface 94 of the curved beam faces an inner surface 98 of the outer support structure 74 and the inner peripheral surface 96 of the curved beam faces an outer surface 100 of the inner support structure 76.

Figure 4:
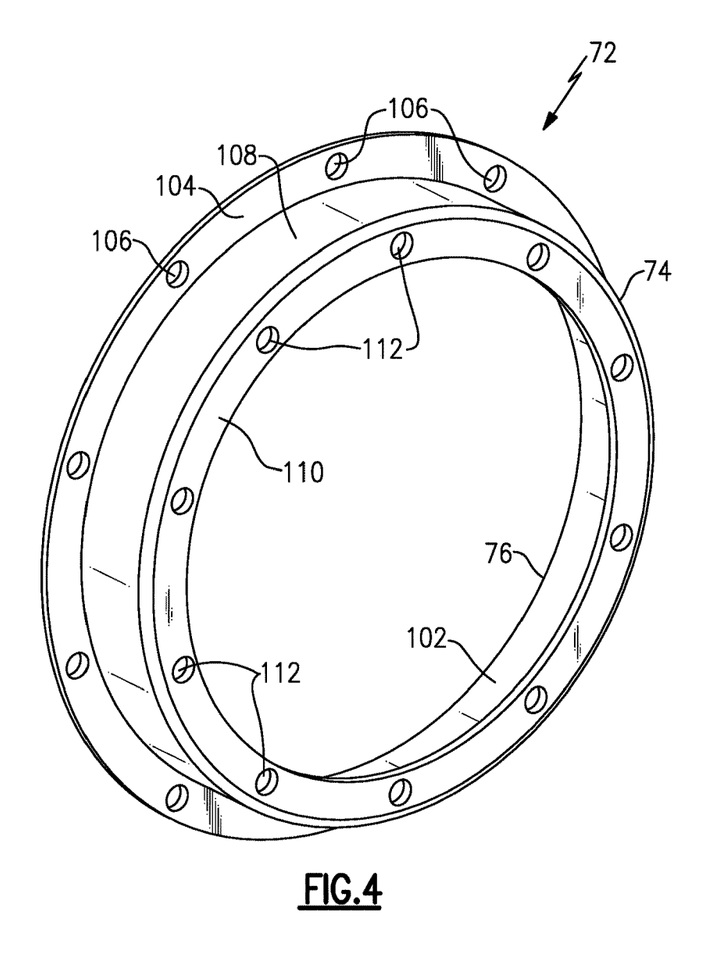
FIG. 4 is a perspective view of the assembly of FIG. 3 as viewed from one end.
Figure 5:
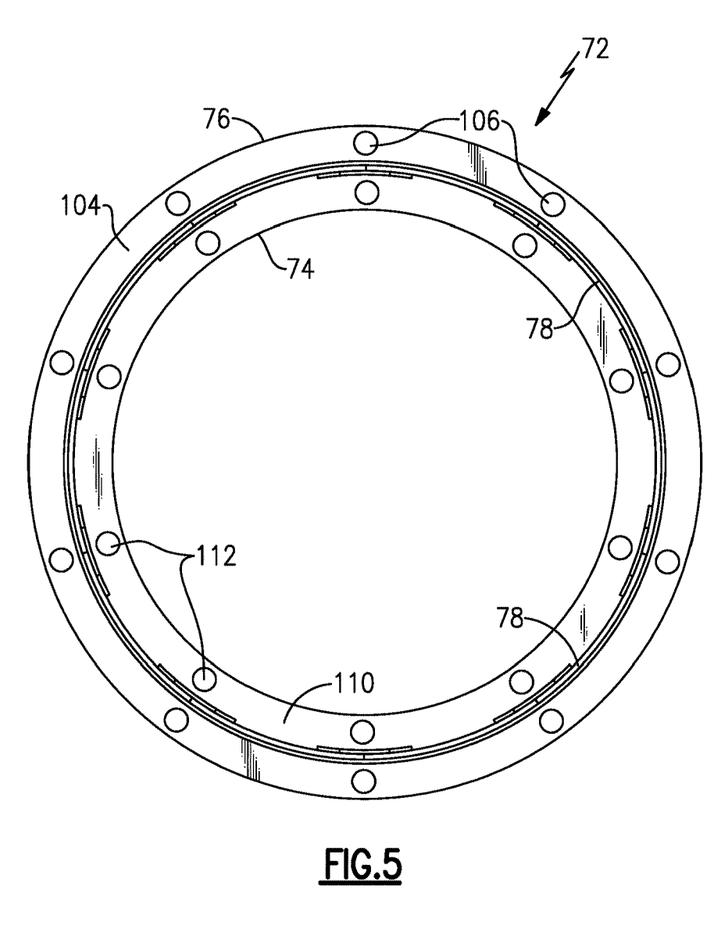
FIG. 5 is a perspective view of the assembly of FIG. 4 as viewed from an opposite end.

FIGS. 4 and 5 show the inner 76 and outer 74 support structures coupled together to form the assembly 72. In one example, the inner support structure 76 includes a ring body 102 with a mounting flange 104 at one edge of the ring body 102 that forms a mount interface that is attached to one of the flange 92 of the engine static structure 64. In this example, the mounting flange 104 extends radially outwardly of the ring body 102. The mounting flange 104 includes a plurality of openings 106 configured to receive fasteners (not shown) to secure the inner support structure 76 to the flange 92. In one example, the outer support structure 74 includes a ring body 108 with a mounting flange 110 at one edge of the ring body 108 that forms a mount interface that is attached to the bearing outer race 66. In this example, the mounting flange 110 extends radially inwardly of the ring body 108. The mounting flange 110 includes a plurality of openings 112 configured to receive fasteners (not shown) to secure the outer support structure 74 to the bearing outer race 66. In the view of FIG. 5, the curved beam spring segments 78 are shown sandwiched between the inner 76 and outer 74 support structures.

Figure 6A:
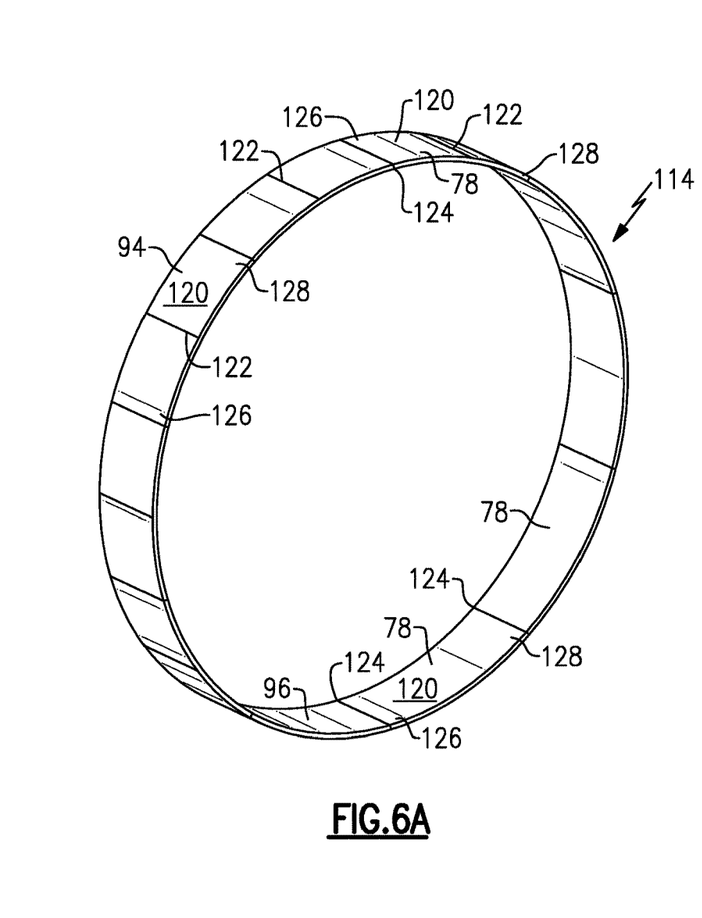
FIG. 6A is a perspective view of the plurality of curved beam spring segments of FIG. 3.
Figure 6B:
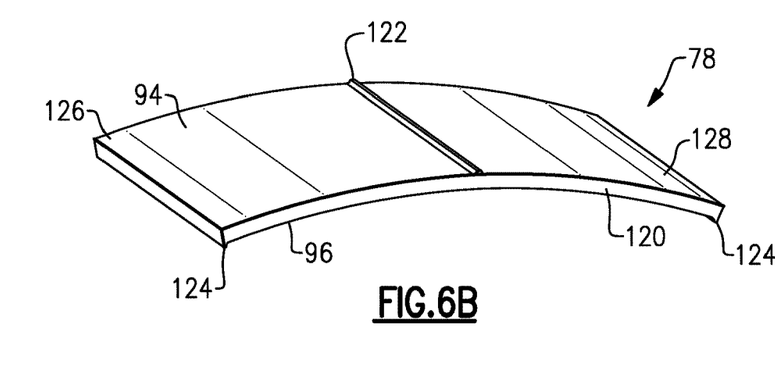
FIG. 6B is an enlarged perspective of one of the plurality of curved beam spring segments of 6A.
Figure 6C:
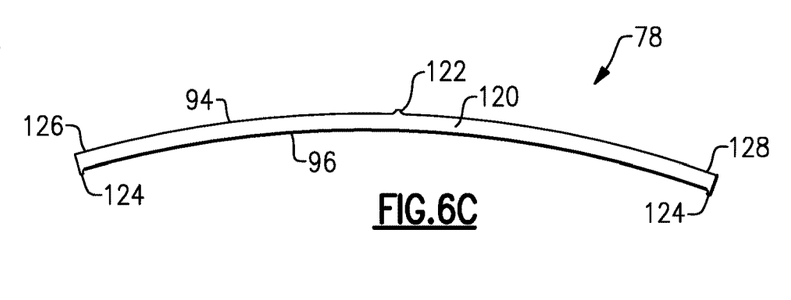
FIG. 6C is a side view of the curved beam spring segment of FIG. 6B.

FIG. 6A shows the curved beam that forms a ring 114, which is comprised of the curved beam spring segments 78, while FIGS. 6B-6C show an example of one of the curved beam spring segments 78. Each curved beam spring segment 78 includes an arcuate body 120 with an outer surface that forms a portion of the outer peripheral surface 94 of the ring 114 and an inner surface that forms a portion of the inner peripheral surface 96 of the ring 114. The arcuate body 120 includes at least one outer damper pedestal 122 extending radially outward of the outer peripheral surface 94 of the arcuate body 120, and at least one inner damper pedestal 124 extending radially inward of the inner peripheral surface 96 of the arcuate body 120. The outer damper pedestal 122 faces and is engageable with the outer support structure 74 and the inner damper pedestal 124 faces and is engageable with the inner support structure 76.

Each arcuate body 120 extends circumferentially from a first end 126 to a second end 128 that is opposite the first end 126 as shown in FIGS. 6A-6B. In one example, the outer damper pedestal 122 is positioned centrally between the first 126 and second ends 128. In one example, the inner damper pedestal 124 comprises at least a first inner damper pedestal 124 adjacent the first end 126 and a second inner damper pedestal 124 adjacent to the second end 128. In one example, there are ten curved beam spring segments 78, In other configurations, the number of curved beam spring segments 78 can be increased or decreased, and/or the number of outer 122 and inner 124 pedestals can be increased or decreased, and can be varied in position, to provide a desired stiffness.

As shown in FIG. 3, the outer support structure 74 comprises a first ring-shaped structure that forms the ring body 108. The ring body 108 has a width that extends from a first edge 130 to an opposite second edge 132. In one example, a first set of tabs 134 is formed at the first edge 130 and a first set of slots 136 is formed at the second edge 132. In one example, the slots 136 are formed at an intersection of the ring body 108 and the radially inward mounting flange 110. The inner support structure 76 comprises a second ring-shaped structure that forms the ring body 102. The ring body 102 has a width that extends from a first edge 140 to an opposite second edge 142. In one example, the ring body 102 includes a second set of tabs 144 formed at the first edge 140 and a second set of slots 146 formed at the second edge 142. In one example, the slots 146 are formed at an intersection of the ring body 102 and the radially outward mounting flange 104.

Figures 7A, 7B, 7C:
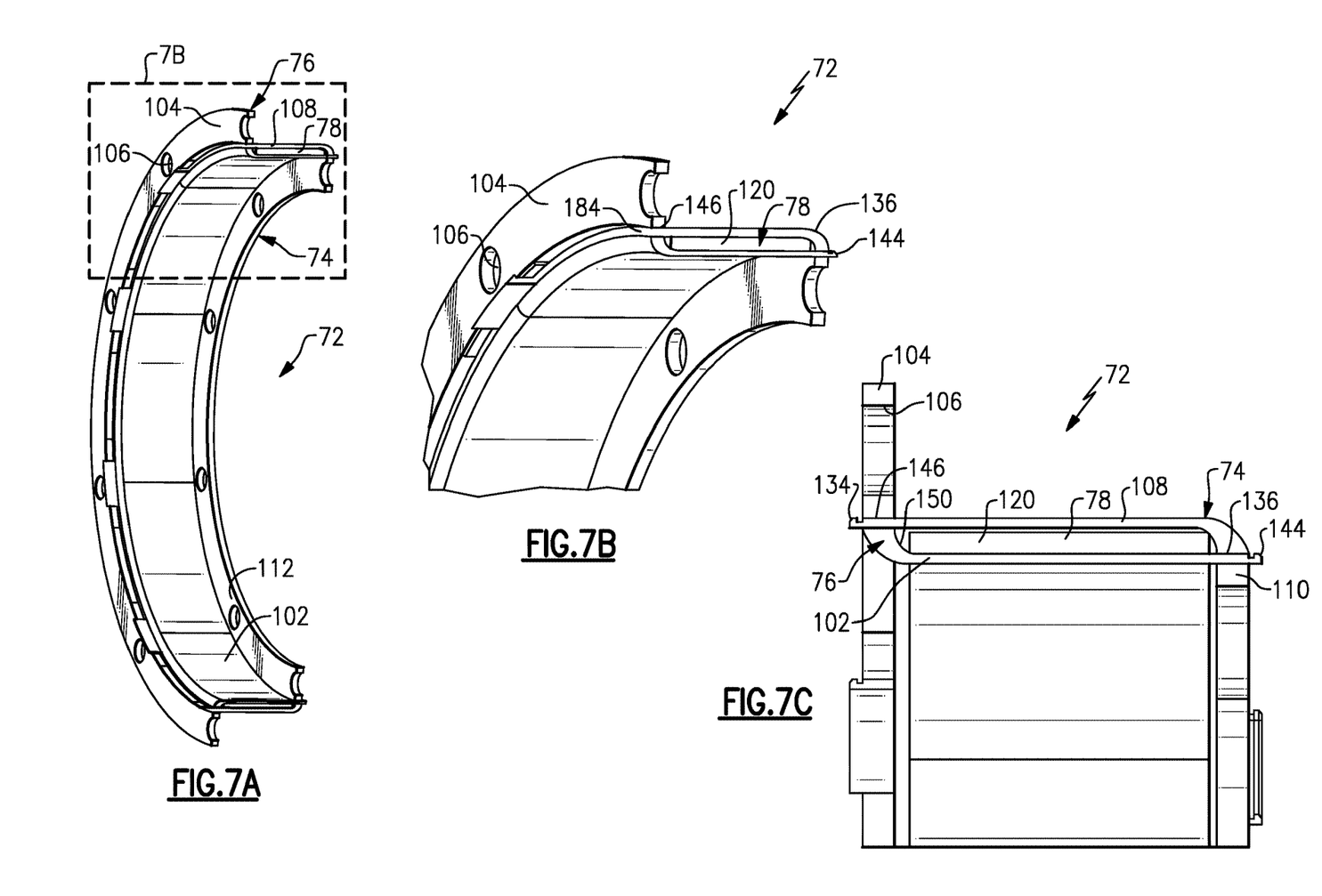
FIG. 7A is a section view of the assembly of FIG. 4.
FIG. 7B is an enlarged section view from a detail as identified in FIG. 7A.
FIG. 7C is an end view of the section of FIG. 7B.

The inner 76 and outer 74 structures are coupled together by inserting the second set of tabs 144 through the first set of slots 136 and by inserting the first set of tabs 134 through the second set of slots 146. This is best shown in FIGS. 7A-7C. In these section views, the spring elements 78 are completely enclosed within an open space 150 that is provided between the overlapping ring bodies 102, 108 (FIG. 7C). In one example, clips (not shown) are received in grooves formed immediately adjacent to the tabs 134, 144 and outboard of the flanges 104, 110 to axially retain the assembly together. This connection interface between the inner 76 and outer 74 support structures, and around the curved beam ring 114, provides for axial rigidity in a direction along the engine center axis A.

The subject disclosure provides a configuration with a mechanical spring assembly 72 that is separated from a fluid damper 82. While the curved beam ring 114 is radially compliant, the assembly 72 also provides the capability of withstanding bilateral thrust loading. The ring 114 also offers the ability to tune stiffness as needed by varying the number of outer 122 and inner 124 pedestals. The thickness and axial width of the spring segments 78 can also be varied as needed to provide a desired stiffness. By separating the fluid damper and mechanical spring, and with radially aligning the fluid damper and the mechanical spring, a very compact configuration is provided with increased available space as compared to prior centering spring and damper designs.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine component comprising:
an inner support structure surrounding an engine center axis and fixed to a flange of an engine static structure;
an outer support structure spaced radially outward of the inner support structure;
a curved beam comprised of a plurality of curved beam spring segments that are positioned adjacent to each other to form a ring, and wherein the inner and outer support structures are coupled together around the curved beam to enclose the curved beam therebetween and form a mechanical spring assembly;
a bearing spaced radially inward of the mechanical spring assembly, wherein the outer support structure is fixed to an outer race of the bearing; and
a fluid damper that is separated from the mechanical spring assembly, wherein the fluid damper is spaced radially inward of the inner support structure by a compartment formed between an inner surface of the inner support structure and an outer surface of a bearing housing for the bearing.

2. The gas turbine engine component according to claim 1, wherein the bearing includes an inner race fixed for rotation with a shaft about the engine center axis, the outer race spaced radially outward of the inner race, rolling elements received between the inner and outer races, and the bearing housing surrounding the outer race to form a plurality of fluid damping chambers between the bearing housing and the outer race that are sealed by one or more piston rings or o-rings to provide the fluid damper.

3. The gas turbine engine component according to claim 2, wherein the outer race is mounted to the outer support structure and the bearing housing is supported by the flange of the engine static structure.

4. The gas turbine engine component according to claim 1, wherein the curved beam has an outer peripheral surface and an inner peripheral surface surrounding the engine center axis, and wherein the plurality of curved beam spring segments are circumferentially positioned adjacent to each other to form the ring, and wherein the inner and outer support structures surround the curved beam such that the outer peripheral surface of the curved beam faces an inner surface of the outer support structure and the inner peripheral surface of the curved beam faces an outer surface of the inner support structure.

5. The gas turbine engine component according to claim 1, wherein each curved beam spring segment includes an arcuate body having at least one outer damper pedestal extending radially outward of an outer peripheral surface of the arcuate body and at least one inner damper pedestal extending radially inward of an inner peripheral surface of the arcuate body, and wherein the outer damper pedestal is engageable with the outer support structure and the inner damper pedestal is engageable with the inner support structure.

6. The gas turbine engine component according to claim 5, wherein each arcuate body extends circumferentially from a first end to a second end that is opposite the first end, and wherein the at least one outer damper pedestal is positioned centrally between the first and second ends, and wherein the at least one inner damper pedestal comprises at least a first inner damper pedestal adjacent the first end and a second inner damper pedestal adjacent to the second end.

7. The gas turbine engine component according to claim 1, wherein the outer support structure comprises a first ring-shaped structure with a first set of tabs and a first set of slots, and wherein the inner support structure comprises a second ring-shaped structure with a second set of tabs and a second set of slots, and wherein the inner and outer structures are coupled together by inserting the second set of tabs through the first set of slots and by inserting the first set of tabs through the second set of slots.

8. The gas turbine engine component according to claim 1, wherein the plurality of curved beam spring segments comprises at least 10 segments.

9. A gas turbine engine component comprising:
an inner support structure surrounding an engine center axis and fixed to an engine static structure;
an outer support structure spaced radially outward of the inner support structure;
a curved beam comprised of a plurality of curved beam spring segments that are positioned adjacent to each other to form a ring, and wherein the inner and outer support structures are coupled together around the curved beam to enclose the curved beam therebetween and form a mechanical spring assembly;
a bearing spaced radially inward of the mechanical spring assembly, wherein the bearing includes an inner race fixed for rotation with a shaft about the engine center axis, an outer race fixed to the outer support structure, and rolling elements received between the inner and outer race;
a squeeze film damper associated with the bearing, wherein the squeeze film damper is separated from the mechanical spring assembly; and
a bearing housing surrounding the outer race to form a plurality of fluid damping chambers between the bearing housing and the outer race that are sealed by one or more piston rings or o-rings to provide the squeeze film damper.

10. The gas turbine engine component according to claim 9, wherein each curved beam spring segment includes an arcuate body having at least one outer damper pedestal extending radially outward of an outer peripheral surface of the arcuate body and at least one inner damper pedestal extending radially inward of an inner peripheral surface of the arcuate body, and wherein the outer damper pedestal is engageable with the outer support structure and the inner damper pedestal is engageable with the inner support structure.

11. The gas turbine engine component according to claim 10, wherein each arcuate body extends circumferentially from a first end to a second end that is opposite the first end, and wherein the at least one outer damper pedestal is positioned centrally between the first and second ends, and wherein the at least one inner damper pedestal comprises at least a first inner damper pedestal adjacent the first end and a second inner damper pedestal adjacent the second end.

12. The gas turbine engine component according to claim 9, wherein an outer surface of the bearing housing is radially aligned with and spaced apart from the mechanical spring assembly by a gap.

13. The gas turbine engine component according to claim 9, wherein the bearing housing is spaced radially apart from the inner support structure by a compartment.

14. A gas turbine engine component comprising:
an inner support structure surrounding an engine center axis and fixed to an engine static structure;
an outer support structure spaced radially outward of the inner support structure, wherein the outer support structure comprises a first ring-shaped structure with a first set of tabs and a first set of slots, and wherein the inner support structure comprises a second ring-shaped structure with a second set of tabs and a second set of slots, and wherein the inner and outer structures are coupled together by inserting the second set of tabs through the first set of slots and by inserting the first set of tabs through the second set of slots;
a curved beam comprised of a plurality of curved beam spring segments that are positioned adjacent to each other to form a ring, and wherein the inner and outer support structures are coupled together around the curved beam to enclose the curved beam therebetween and form an assembly, and wherein each curved beam spring segment includes an arcuate body having at least one outer damper pedestal extending radially outward of an outer peripheral surface of the arcuate body and at least one inner damper pedestal extending radially inward of an inner peripheral surface of the arcuate body, and wherein the outer damper pedestal is engageable with the outer support structure and the inner damper pedestal is engageable with the inner support structure;
a bearing spaced radially inward of the assembly, wherein the bearing includes an inner race fixed for rotation with a shaft about the engine center axis, an outer race fixed to the outer support structure, rolling elements received between the inner and outer races, and a bearing housing surrounding the outer race; and
a squeeze film damper associated with the bearing, and wherein the bearing housing surrounds the outer race to form a plurality of fluid damping chambers between the bearing housing and the outer race that are sealed by one or more piston rings or o-rings to provide the squeeze film damper.

15. The gas turbine engine component according to claim 14, wherein the curved beam has an outer peripheral surface and an inner peripheral surface surrounding the engine center axis, and wherein the plurality of curved beam spring segments are circumferentially positioned adjacent to each other to form the ring, and wherein the inner and outer support structures surround the curved beam such that the outer peripheral surface of the curved beam faces the first ring-shaped structure and the inner peripheral surface of the curved beam faces the second ring-shaped structure.

16. The gas turbine engine component according to claim 14, wherein the outer support structure is fixed to the outer race and the inner support structure is fixed to a flange of the engine static structure.

17. The gas turbine engine component according to claim 16, wherein the bearing housing is supported by the engine static structure.

18. The gas turbine engine component according to claim 17, wherein the outer support structure includes a first mount interface that is attached to the outer race and the inner support structure includes a second mount interface that is attached to the flange.

* * * * *